United States Patent [19]
Koizumi

[11] 4,044,166
[45] Aug. 23, 1977

[54] EXPANDED BOARD OR SHEET-LIKE FOOD PRODUCT AND METHOD OF MANUFACTURING THE SAME

[75] Inventor: Eiji Koizumi, Niigata, Japan

[73] Assignee: Kameda Seika Co., Ltd., Niigata, Japan

[21] Appl. No.: 692,037

[22] Filed: June 2, 1976

[30] Foreign Application Priority Data

June 6, 1975 Japan .................................. 50-68375
June 24, 1975 Japan .................................. 50-78453

[51] Int. Cl.² .......................... A21D 13/08; A23L 1/16
[52] U.S. Cl. .................................... 426/560; 426/559; 426/637; 426/661; 426/451; 426/502; 426/517; 426/144
[58] Field of Search ................. 426/76, 104, 122, 144, 426/549, 559, 661, 383, 512, 514, 516, 517, 637, 560, 451, 502; 264/282, 283, 286; 428/315, 316, 318

[56] References Cited

U.S. PATENT DOCUMENTS

| 968,110 | 8/1910 | Barbieri | 426/517 X |
| 1,107,325 | 8/1914 | Laskey | 426/514 ZX |
| 2,529,661 | 11/1950 | Millstein | 426/104 |
| 3,275,457 | 9/1966 | Vischer, Jr. | 426/144 |

*Primary Examiner*—Raymond N. Jones
*Assistant Examiner*—R. A. Yoncoskie
*Attorney, Agent, or Firm*—Finnegan, Henderson, Farabow & Garrett

[57] ABSTRACT

An expanded board-like food product in the form of a thin wafer-like sheet having a plurality of elongated chambers rectangular in cross section and formed by passing a viscoelastic dough cake formed of edible vegetable material through a gap between a pair of opposingly rotating rollers and then a gap between a pair of scrapers. The product has many advantages to the conventional plastic porous board.

8 Claims, 5 Drawing Figures

EXPANDED BOARD OR SHEET-LIKE FOOD PRODUCT AND METHOD OF MANUFACTURING THE SAME

BACKGROUND OF THE INVENTION

This invention relates to an expanded board of sheet-like structure and a process for manufacturing the same, and particularly to a novel food product in the form of a thin wafer-like sheet expanded in thickness and having a plurality of elongated chambers rectangular in cross section and the process for manufacturing the same.

In the prior art, many types of board or sheet-like structures were used in many fields from the view point of shock absorbing characteristics, improved solubility, increased surface area, decreased weight, etc. However, in the prior art, expanded board or sheet like structure can be obtained only with many difficulties, for example corrugated board or sheet can be obtained by only two processes.

One such process includes an extrusion through a nozzle means. The other is a conventional corrugated cardboard manufacturing process wherein corrugated board is produced by coating both sides, that is, the tops of the mountain parts of the corrugated medium, moulded into the shape of wave, with starch solution, putting on the both sides, surface and back side liners, and further passing it onto a hot plate heated at 160° C – 180° C to make the starch solution pasty by heated liners, followed by drying.

However, the former process has the disadvantages of expensive machine costs and the difficulty of maintaining quality product control, particularly for the productionof a thin sheet. The latter process also has similar disadvantages accompanied by large sized machine installation and the difficulty in obtaining a small sized product. A small sized product has been needed for many years and for many fields, particularly for food industries.

Accordingly, it is the object of the present invention to provide a novel process for the production of a novel expanded board or sheet-like structure improved in strength and appearance, and without using conventional machinery.

SUMMARY OF THE INVENTION

According to the process of the present invention, a viscoelastic material is passed through a gap between a pair of oppositely rotating rollers. The viscoelastic film sheet obtained adheres to the roller surfaces and is forced to expand in thickness until it advances to a gap between a pair of scrapers where the expanded film surfaces are torn or scraped off the roller surfaces to form an expanded board or sheet-like structure. This structure is characterized by a cross section having a plurality of elongated chambers rectangular in cross section. That is, the cross section comprises a surface sheet, back sheet and a number of longitudinally spaced bulk-heads, the respective rectangular chambers being surrounded by the surface sheet wall, the back sheet wall and next adjacent but spaced bulkheads walls.This is schematically illustrated best in FIG. 5 of the drawings.

This structure according to the present invention is quite novel, refined, aesthetic in appearance, and very different from products obtained byconventional processes in the prior art. The expanded board or sheet-like structure of this invention has remarkably improved structural strength due to the presence of the large number of bulkheads between the chambers. Further it should be noted that by the process of the present invention, highly refined thinner and smaller products can be obtained than conventional processes. This is a great advantage of the process according to the present invention and many applications can be expected in many fields in future.

Any viscoelastic material may be employed, for examples, synthetic polymers, natural polymer, etc. for the raw material, and many new type products of shock absorbers, catalytic contactors, insulating materials, food products, building materials, etc. can be obtained through the process of the present invention.

DESCRIPTION OF THE PREFERRED EMBODIMENT

The process of the present invention will be further illustrated with reference to the drawings.

Figure 1:
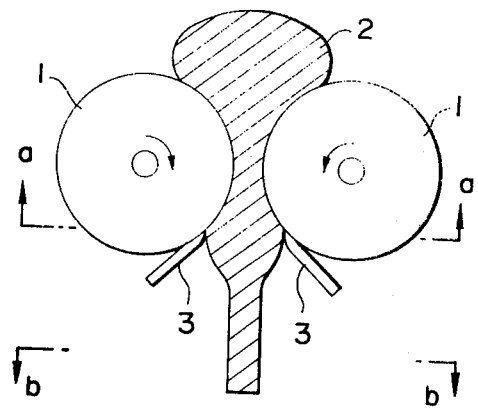
FIG. 1 is a schematic view in vertical section illustrating a preferred embodiment of the invention.
Figure 2:
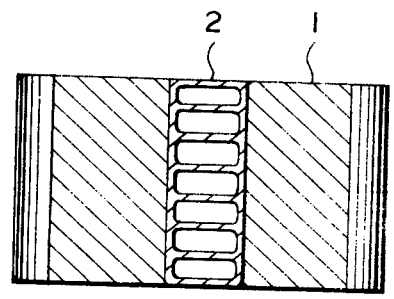
FIG. 2 is a schematic cross sectional view taken along line a—a in FIG. 1 to illustrate the structure of the viscoelastic material as it emerges from between a pair of rollers.
Figure 3:
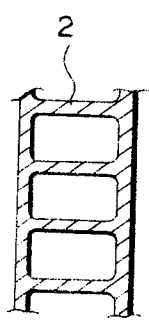
FIG. 3 is a schematic cross sectional view taken along line b—b in FIG. 1 to illustrate the resulting structure.
Figure 4:
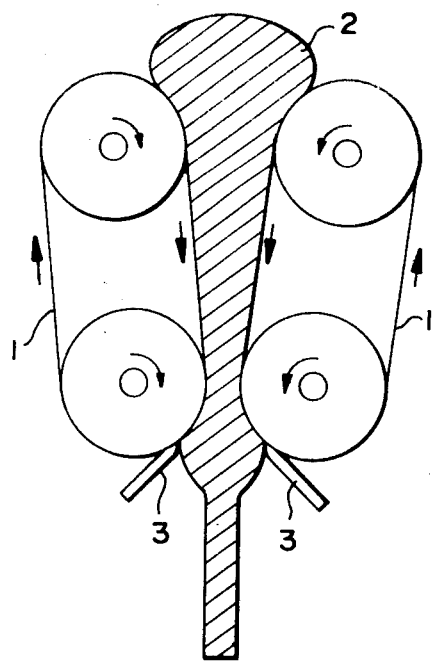
FIG. 4 is a view similar to FIG. 1 illustrating an alternative embodiment of the invention using a pair of endless belts.
Figure 5:
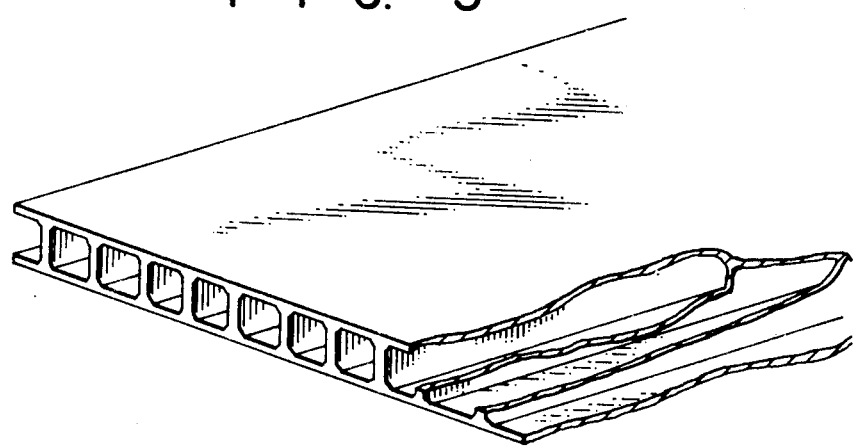
FIG. 5 is a perspective view partially in cross section of the product obtained according to the invention.

With reference to FIGS. 1 and 4, a viscoelastic material 2 is passed through a gap between a pair of rollers 1, 1 or a pair of endless belts 1, 1 and torn or scraped off the surfaces of the rollers 1, 1 or endless belts 1, 1 by a pair of scrapers 3, 3 to form a board or sheet-like material. The structures of viscoelastic material in cross section are shown in FIGS. 2 and 3.

From the above explanation, it is obvious to those skilled in the art that any strict controls or regulations for the process, physically or chemically, are not needed and any troublesome additives are not needed for the production of the structure according to the present invention.

Thus, superior quality of an expanded board or sheet-like product can be quite easily obtained without any strict control of the ingredients or physical conditions. For example, any starch containing material like rice, wheat, corn or other cereals, potatoes, etc. can be applied to the process of the present invention. That is, the viscoelastic material of the present invention can be easily prepared from the starches contained in the above materials by a conventional gelatinizing process like water addition, heating, etc. by means of, for example, heat exchanging double oven, direct steam injection or hot water addition. Gelatinizing of starches under heating is effected, preferably with starches containing 35% by weight or more of water, and heating is not always necessary for gluten-containing material like wheat or gluten added materials.

The invention will be further illustrated but is not limited by the following examples.

EXAMPLE 1

After adding water to adjust the water content to 46%, 10 kg of non-glutinous steamed rice flour of 300 mesh in particle size was again steamed under the pressure of 0.25 kg/cm$^2$ for 8 minutes in a steam kneader, and then sufficiently kneaded in a kneader to obtain a dough cake. The dough cake was passed through a gap of 0.3 mm between a pair of rotating rollers and subsequently a gap of 9 mm between a pair of scrapers. The rolled dough cake was torn off the surfaces of the rollers by the scrapers to form a board or sheet-like structure expanded in thickness, having a plurality of enlongated rectangular perforations or chambers in cross section. The rectangular perforations were 2.2 mm in length and 2.6 mm in width.

In the same manner, the process of the invention was carried out by setting the gap between a pair of rotating rollers at 0.6 mm and 0.9 mm, respectively, to obtain an expanded board structure with a plurality of elongated rectangular perforations or chambers in cross section. The rectangular perforations were respectively 3 mm × 3.7 mm and 3.8 mm × 4.3 mm.

The board structure obtained was cut into desired pieces, dried to adjust the water content to about 13% and baked to give non-glutinous wafer-like rice crackers with such a structure as shown above.

The rice crackers were very excellent and refined in both appearance and taste, as compared with so-called rice crackers produced in the prior art.

EXAMPLE 2

1 kg of wheat flour, 200 g of sugar, 200 g of butter, 2 g of sodium bicarbonate, 2 g of ammonium carbonate and 230 g of hot water at 90° C was sufficiently mixed and kneaded in a mixer to obtain a viscoelastic dough cake. The dough cake was passed through the gap of 0.9 mm between a pair of rotating rollers, and then the gap of 9 mm between a pair of scrapers. The rolled cake was thus torn off the surface of the rollers to form an expanded board or sheet-like structure with a plurality of elongated spaced rectangular perforations or chambers in cross section.

EXAMPLE 3

Water was added to corn starch and homogeneously mixed up to 50% of the water content. The mixture was heated under the pressure of 0.5 kg/cm$^2$ for 12 minutes in an autoclave to obtain a gelatinized dough cake, which was further kneaded sufficiently. This viscoelastic dough cake was passed through a pair of rotating rollers and torn off the surfaces of the rollers by a pair of scrapers to form an expanded board or sheet-like structure. The gaps between the pair of rollers and between the pair of scrapers were 0.3 mm and 9 mm, respectively. The expanded board or sheet-like structure had a plurality of elongated rectangular perforations or chambers which were 2.4 mm in length and 2.5 mm in width in cross section.

The expanded board was dried to 16% of water content, thereby obtaining a semitransparent expanded board. In the cross section of the semitransparent expanded board, the wall thickness of the surface and back sheets, and the inner bulkheads were 0.25 mm and 0.5 mm, respectively. The rectangular perforations were 2.0 mm in length and 1.9 mm in width.

EXAMPLE 4

5 parts by weight of water was added to a mixture comprising 7 parts by weight of potato flakes and 3 parts by weight of waxy corn starch and then mixed sufficiently in a mixer. This homogeneous mixture was kneaded with steam under the pressure of 0.2 kg/cm$^2$ for 8 minutes to give a dough cake. The dough cake was passed through between a pair of rotating rollers having a gap of 0.2 mm, and then between a pair of scrapers having a gap of 7.5 mm. The rolled dough cake was torn off the surfaces of the rollers by the scrapers to form an expanded board or sheet-like structure having a plurality of enlongated spaced rectangular perforation chambers in cross section. In cross section, the rectangular perforations were 2.0 mm in length and 2.2 mm in width.

The expanded board was then cut into desired pieces, and dried at 60° C in a drier, whereby the water content was adjusted to about 10%. The dried pieces were fried in an oil bath at 150° C to give tasty food like potato chips having rectangular perforations in cross section.

As is understood from the above explained examples, a novel refined expanded wafer-like food product, that is quite different from those known in the prior art, is easily obtained according to the present invention, without employing any expensive machine or any special ingredients. Further, the food product of the present invention is quite excellent and refined in appearance and taste.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A sheet-like food product having solely a surface sheet, a backing sheet spaced from said surface sheet, and a plurality of laterally spaced generally parallel bulkheads extending between said surface sheet and said backing sheet and defining a plurality of elongated laterally spaced rectangular chambers between said sheets and said bulkheads formed by passing a viscoelastic dough cake comprised of edible vegetable material through a gap between a pair of oppositely rotating rollers and subsequently through a gap between a pair of scrapers where the scrapers scrape the dough cake from the rollers and form the sheet-like food product.

2. A food product according to claim 1 wherein the gap between the scrapers is larger than the gap between the pair of rollers.

3. A food product according to claim 2 formed of a material containing starch wherein said dough cake comprises a gelatinized starch material.

4. A food product according to claim 2 formed of a rice derivative wherein said dough cake is comprised of gelatinized rice flour.

5. A food product according to claim 2 formed of a wheat derivative wherein said dough cake is comprised of a gelatinized wheat flour.

6. A food product according to claim 2 formed of a corn derivative wherein said dough cake is comprised of gelatinized corn starch.

7. A food product according to claim 2 formed of a potato derivative wherein said dough cake is comprised of gelatinized potato flakes.

8. A process for manufacturing a sheet-like food product having a surface sheet, a backing sheet, and a plurality of laterally spaced generally parallel bulkheads extending between said surface sheet and said backing sheet and defining a plurality of elongated laterally spaced rectangular chambers between said sheets and said bulkheads comprising passing a viscoelastic dough cake comprised of edible vegetable materials through a first gap between a pair of oppositely rotating rollers, passing the dough cake emergent from the first gap through a second gap between a pair of scrapers, said second gap being larger than said first gap, and scraping the dough cake from the rollers using said scrapers to form a sheet-like structure expanded in thickness.

* * * * *